(12) United States Patent
Scott (10) Patent No.: US 12,338,122 B2
(45) Date of Patent: Jun. 24, 2025

(54) LOW FREQUENCY OZONE GENERATOR

(71) Applicant: Primozone Production AB, Löddeköpinge (SE)

(72) Inventor: Mikael Scott, Löddeköpinge (SE)

(73) Assignee: Primozone Production AB, Löddeköpinge (SE)

( * ) Notice: Subject to any disclaimer, the term of this patent is extended or adjusted under 35 U.S.C. 154(b) by 846 days.

(21) Appl. No.: 17/310,724

(22) PCT Filed: Feb. 24, 2020

(86) PCT No.: PCT/EP2020/054753
§ 371 (c)(1),
(2) Date: Aug. 19, 2021

(87) PCT Pub. No.: WO2020/173865
PCT Pub. Date: Sep. 3, 2020

(65) Prior Publication Data
US 2022/0135405 A1    May 5, 2022

(30) Foreign Application Priority Data
Feb. 25, 2019  (EP) .................................. 19159104

(51) Int. Cl.
*C01B 13/11*       (2006.01)
*H01F 27/24*       (2006.01)
(Continued)

(52) U.S. Cl.
CPC .............. *C01B 13/11* (2013.01); *H01F 27/24* (2013.01); *H01F 27/28* (2013.01); *H01F 30/06* (2013.01);
(Continued)

(58) Field of Classification Search
CPC . C01B 13/11; C01B 2201/22; C01B 2201/24; C01B 2201/32; C01B 2201/64;
(Continued)

(56) References Cited

U.S. PATENT DOCUMENTS 5,089,098 A * 2/1992 Tacchi ................... C01B 13/11
                                                          204/176
2001/0046459 A1   11/2001 St. Onge et al.
(Continued)

FOREIGN PATENT DOCUMENTS

EP       0200313 B1    1/1990
EP       0901136 B1    6/2003
(Continued)

OTHER PUBLICATIONS

International Search Report for PCT/EP2020/054753 dated Jun. 8, 2020.
(Continued)

*Primary Examiner* — Xiuyu Tai
(74) *Attorney, Agent, or Firm* — Knobbe, Martens, Olson & Bear, LLP (57) ABSTRACT

The present invention relates to a method of operating an ozone generator, a transformer assembly and an ozone generator apparatus configured to be operated at an operational frequency range between 25-40 kHz, such as between 30 and 40 kHz.

15 Claims, 5 Drawing Sheets

(51) Int. Cl.
*H01F 27/28* (2006.01)
*H01F 30/06* (2006.01)
*H05H 1/24* (2006.01)
*H01T 19/00* (2006.01)

(52) U.S. Cl.
CPC ........... *H05H 1/47* (2021.05); *C01B 2201/22* (2013.01); *C01B 2201/24* (2013.01); *C01B 2201/32* (2013.01); *C01B 2201/64* (2013.01); *C01B 2201/72* (2013.01); *C01B 2201/76* (2013.01); *C01B 2201/90* (2013.01); *H01T 19/00* (2013.01)

(58) Field of Classification Search
CPC ............ C01B 2201/72; C01B 2201/76; C01B 2201/90; C01B 2201/02; C01B 2201/14; C01B 2201/10; C01B 2201/74; C01B 2201/40; C01B 13/115; H05H 1/47; H01F 27/24; H01F 27/28; H01F 30/06; H01T 19/00; C02F 1/78; C02F 2103/008; C02F 2201/782; C02F 2103/08; B01J 35/39; H02M 7/48; H02M 3/33573; H02M 1/36; H02M 1/32; H02M 3/01; H02M 1/0058; H02M 7/4815; H02M 1/007; H02M 1/0025; H02M 5/458; Y02B 70/10; H01J 37/248; Y02P 20/10; Y02P 20/133; Y02W 10/37
See application file for complete search history.

(56) References Cited

U.S. PATENT DOCUMENTS

| | | | |
|---|---|---|---|
| 2002/0006366 A1* | 1/2002 | Borgstrom | C01B 13/11 422/186.2 |
| 2008/0245659 A1 | 10/2008 | Matsuno | |
| 2012/0156106 A1 | 6/2012 | Murata et al. | |
| 2013/0257301 A1 | 10/2013 | Tran et al. | |
| 2015/0061808 A1 | 3/2015 | Iwakura et al. | |
| 2019/0071310 A1* | 3/2019 | Arlemark | C01B 13/11 |
| 2019/0269015 A1 | 8/2019 | Nakazawa | |
| 2020/0207620 A1* | 7/2020 | Tabata | C02F 1/78 |

FOREIGN PATENT DOCUMENTS

| | | |
|---|---|---|
| JP | 5193086 B2 | 5/2013 |
| JP | 2013-214628 A | 10/2013 |
| JP | 2018-531211 A | 10/2018 |
| KR | 2000-0074302 A | 12/2000 |
| KR | 10-0302357 B1 | 10/2001 |
| KR | 2005-0080435 | 8/2005 |
| WO | WO 94/04011 A1 | 2/1994 |
| WO | WO 00/53529 A1 | 9/2000 |
| WO | WO 02/20398 A1 | 3/2002 |
| WO | WO 2008/074767 A2 | 6/2008 |
| WO | WO 2017/060907 A1 | 4/2017 |
| WO | WO 2018/025133 A1 | 2/2018 |
| WO | WO 2018/092392 A1 | 5/2018 |

OTHER PUBLICATIONS

Office Action for KR 2021-7030206 dated Jul. 15, 2023.
Facta, Mochammad et al., "Silent Discharge Ozonizer for Colour Removal of Treated Palm Oil Mill Effluent Using a Simple High Frequency Resonant Power Converter" abstracts of 2010 IEEE International Conference on Power and Energy (PECon 2010), 2010, pp. 1-6.
Haverkamp, R.G. et al., "Ozone Production in a High Frequency Dielectric Barrier Discharge Generator" Ozone Science & Engineering, 2002, pp. 321-328, vol. 24, No. 5.
Office Action issued for CN 202080016326.7 issued Dec. 15, 2023.
Office Action for JP 2021-572703 issued Jan. 30, 2024.
Amjad, Muhammad et al., "Analysis and Implementation of Transformerless LCL Resonant Power Supply for Ozone Generation" IEEE Transactions on Power Electronics, Feb. 2013, pp. 650-660, vol. 28, No. 2.
Amjad, Muhammad et al., "Design and implantation of a high-frequency LC-based half-bridge resonant converter for dielectric barrier discharge ozone generator" IET Power Electron, 2014, pp. 2403-2411, vol. 7, Issue 9.
Filchev, T. et al., "High Power, High Voltage, High Frequency Transformer / Rectifier for HV Industrial Applications".
Seok, D.C. et al., "DBD parameter for production of high ozone concentration" $31^{st}$ ICPIG, Jul. 14-19, 2013, Granada, Spain.
You, Changqi et al., "An Isolated High-Voltage High-Frequency Pulsed Power Converter for Non-Thermal Plasma Ozone Generation" Department of Electrical and Computer Engineering University of Michigan-Dearborn, pp. 2232-2237.
Minipuls Universal—Full bridge square wave generator for driving high frequency transformers, GBS Elektronik GmbH, Nov. 8, 2017.
Notice of Opposition to a European Patent—EP 3932149—by Primozone Production AB—dated Mar. 4, 2024.
Notice of Opposition to a European Patent—EP 3932149—by Xylem Europe GmbH—dated Mar. 5, 2024.
Examination Report for IN 202127038514 dated Apr. 28, 2023.

* cited by examiner

LOW FREQUENCY OZONE GENERATOR

CROSS REFERENCE TO RELATED APPLICATIONS

This application is a U.S. National Phase Application of PCT International Application Number PCT/EP2020/054753, filed on Feb. 24, 2020, designating the United States of America and published in the English language, which is an International Application of and claims the benefit of priority to European Patent Application No. 19159104.9, filed on Feb. 25, 2019. The disclosures of the above-referenced applications are hereby expressly incorporated by reference in their entireties.

FIELD OF THE INVENTION

The present invention relates to an ozone generator apparatus configured to be operated at an operational frequency range between 25-40 kHz.

The present invention also relates to a method of operating an ozone generator apparatus at a frequency between 25-40 kHz.

The present invention also relates to a transformer assembly, such as a high power transformer configured for providing or adapted to provide power within a frequency range between 25-40 kHz.

BACKGROUND OF THE INVENTION

Successful ozone water treatment installation depends on the ability of securing the required level of ozone in the water at all times.

Correct removal of heavy metal from contaminated ground water, appropriate removal of colloidal solids, dissolved organic compounds and transformation of nitrite into nitrate in aquaculture systems and efficient solutions to municipal ozone water treatment issues depend on the ability of securing the required level of ozone in the water at all times.

Ozone generating apparatus are preferably operated at frequency above the audible range for humans, i.e. in the frequency range between 15-25 kHz, as disclosed, for example, by WO 2008/074767.

Operating at high frequency is also desirable as having the advantage of requiring lower operating voltages for a given input power compared to low frequency operation, as disclosed, for example, by Kogelschatz in Plasma Chemistry and Plasma processing, Vol 23, (1): (1-46).

However, ozone generators operating at high frequency do not always secure the release of the required level of ozone. For example, the actual release of ozone, i.e. the concentration of ozone released, may be, in some cases, lower than a set value or lower than the acceptable limits.

Hence, an improved ozone generator would be advantageous, and in particular a more efficient and reliable ozone generator apparatus able to secure the required level of ozone in the water to be treated at all times, would be advantageous.

OBJECT OF THE INVENTION

An object of the present invention is to provide an ozone generator apparatus able to secure the required level of ozone in the water to be treated at all times.

A further object of the present invention is to provide a method of operating an ozone generator apparatus able to secure the required level of ozone in the water to be treated at all times.

An even further object of the present application is to provide a transformer assembly for powering an ozone generator apparatus able to secure the required level of ozone in the water to be treated at all times.

An object of the present invention may also be seen as to provide an alternative to the prior art.

In particular, it may be seen as a further object of the present invention to provide an ozone generator apparatus, a transformer assembly for powering an ozone generator apparatus and a method of operating an ozone generator apparatus that solves the above mentioned problems of the prior art by being configured to be operated at an operational frequency range between 25-40 kHz.

SUMMARY OF THE INVENTION

Thus, the above described object and several other objects are intended to be obtained in a first aspect of the invention by providing an ozone generator apparatus comprising: an ozone generator unit comprising a high voltage electrode unit, a first and second dielectric element and a first and second earth electrode.

The generator unit is configured or adapted to be operated at an operational frequency range between 25-40 kHz.

For example, the operational frequency may be between 30 and 40 kHz, such as between 31 and 37 kHz.

In search for optimizations in the field of ozone generation, the inventors noticed that the decrease of the frequency of operation increases the productivity of the ozone generator.

In general, operating at low frequency is not desirable since operating an ozone generator at high frequency has the advantage of lower operating voltages for a given input power.

Furthermore, the decrease of the operational frequency increases the audible noise produced by the ozone generator unit. Indeed, ozone generating apparatus are preferably operated at frequency way above the audible range for humans.

The inventors, in search of optimization in the field of ozone generation, investigated the operational frequency range in connection to the undesired background noise produced during operation and in relation to the optimal ozone release.

The inventors thus identified a frequency range in which correspondence between set value and actual value of ozone release is optimized for the minimum audible operational disturbance.

The ozone generator apparatus according the first aspect of the invention may further comprise a low frequency, high voltage AC power supply, such as a high power transformer or a transformer assembly, configured or adapted to provide between 50 and 800 Watts at a frequency between 25 and 40 kHz to the ozone generator unit.

For example, the high voltage AC power supply may be configured or adapted to provide between 50 and 800 Watts at a frequency between 30 and 40 kHz, such as preferably between 31 and 37 kHz.

The presence of the high voltage AC power supply configured or adapted to provide between 50 and 800 Watts enables the operational frequency between 25 and 40 kHz of the ozone generator unit.

The high voltage AC power supply of the invention may be referred to herein as high power transformer, as transformer or as transformer assembly.

In relation to the structure of the ozone generator unit, such as the high voltage electrode unit, the first and second dielectric element and the first and second earth electrode it is referred to structures and elements disclosed in WO 02/20398 herein incorporated by reference.

First and second dielectric elements may be polymer layers, such as thin layer of polymer materials, e.g. sheets of Polytetrafluoroethylene (PTFE).

In some embodiments, the high voltage electrode unit is located between the first and the second dielectric element.

The first and the second dielectric element may be located at a distance from the high voltage electrode unit within a range between 0.01 and 0.5 millimeters, such as between 0.01 and 0.4 millimeters, for example between 0.01 and 0.3 millimeters, such as between 0.01 and 0.1.

In some further embodiments, the first and the second dielectric element may be spaced a part from the high voltage electrode unit by one or more spacer elements.

The first and the second dielectric element may be spaced a part from the high voltage electrode unit by the one or more spacer elements within 0.01 and 0.5 millimeters, such as between 0.01 and 0.4 millimeters, for example between 0.01 and 0.3 millimeters, such as between 0.01 and 0.1

The first and second dielectric may be arranged on both sides of the high voltage electrode.

In some embodiments, the first and a second earth electrode delimit, with the first and second dielectric, a first and a second reaction chamber.

The first and second reaction chamber may comprise each an inlet for supplying oxygen gas or oxygen containing gas and an outlet for releasing ozone gas.

The external surface of the first and second reaction chamber may comprise cooling elements, such as cooling fins.

In some embodiments, air cooling may be used alone or in combination with water cooling, increasing the efficiency of the ozone generator unit.

In some other embodiments, water cooling may be used alone for cooling the ozone generator unit.

The high voltage electrode may be arranged as a metallic coating on the first and/or the second dielectric.

In some other embodiments, the high voltage electrode is a metal foil or a metal sheet.

In some further embodiments, the first and second dielectric element may be in contact with an internal surface of the first and second reaction chamber.

The specific configuration mentioned above has the advantage that heat produced during ozone production can be dissipated more efficiently as heat exchange between the cooled earth electrodes being part of the first and second reaction chamber and the first and second dielectric in contact with the internal surface the first and second reaction chamber is more efficient.

In a second aspect, the invention relates to a method of operating an ozone generator apparatus according to the first aspect of the invention, the method comprising: operating the ozone generator apparatus at a frequency between 25-40 kHz, such as between 30 and 40 kHz.

In some embodiments, according to the second aspect of the invention, the operating of the ozone generator apparatus according to the first aspect of the invention comprises: supplying a flow of fluid containing oxygen gas to the ozone generator unit; controlling the flow of fluid containing oxygen gas; controlling a power supplied from a power supply apparatus to the ozone generator at a frequency between 25-40 kHz, such as between 30 and 40 kHz.

In a third aspect, the invention relates to a method of operating an ozone generator apparatus, the method comprising operating said ozone generator apparatus at a frequency between 25-40 kHz, such as between 30 and 40 kHz.

In some embodiments of the method of operating the ozone generator apparatus according to the third aspect of the invention, operating the ozone generator comprises: supplying a flow of fluid containing oxygen gas to the ozone generator; controlling the flow of fluid containing oxygen gas; controlling a power supplied from a power supply apparatus to the ozone generator at a frequency between 25-40 kHz, such as between 30 and 40 kHz.

In some further embodiments of the first, second or third aspect of the invention, the frequency of operation is a frequency between 31 and 40 kHz, such as a frequency between 32 and 35 kHz.

In a forth aspect, the invention relates to a transformer assembly or a transformer, such as a high power transformer configured to or adapted for providing electrical power within a frequency range between 25-40 kHz, such as between 30 and 40 kHz.

The transformer assembly according to the forth aspect may comprise a ferrite shell type core surrounding a primary winding and a secondary winding. The primary windings may have less than 14 turns and the secondary winding may have more than 107 turns. The ferrite shell type core may have an air gap smaller than 2.0 mm.

In some embodiments, the ferrite shell type core comprises at least two parts separated from each other by an air gap smaller than 2.0 mm.

The inventors devised the high power transformer considering that the operational frequency of the ozone generator unit depends on the capacitance on the reactor and the inductance on the secondary side on the high voltage transformer. The inductance on the primary side on the high voltage transformer and the serial inductance has also some influence on the operational frequency of the ozone generator unit.

In order to modify the operational frequency the invention makes use of a transformer assembly with increased inductance.

An approximation of the inductance can be calculated by the formula below:

$$L = \frac{N^2 * \mu_0}{\frac{\sum\left(\frac{l}{A_e}\right)}{\mu_e} + \frac{G}{A_e}}$$

$\mu_0$ is a physical constant and cannot be modified. The mechanical dimensions of the tranformator assembly are constrained by the size of the ozone generator unit. In addition, the ferrite core in the transformer assembly has also pre-defined dimension that cannot be changed.

In practice, according to the formula above means that no modification on $\Sigma(l/A_e)$ (geometrical constant of the core) and $A_e$ (the area of the core) are possible. $\mu_e$ is constant of the material used, being state of the art ferrite.

The solution of the invention is to change N (number of turns of the primary winding) and G (the airgap of the core).

However, the constrain of the mechanical dimension of the generator unit implies that there is no room to increase the number of turns on the secondary winding in the transformer without decreasing the number of turns on the primary winding. The solution of the invention was to modify the number of turns on the primary winding, for example by reducing it by a certain number such as reducing it by 1, 2, 3, 4 or 5 turns from the value currently used in transformer assemblies having an operational frequency of ≈45 kHz, being this for example around 14 turns. This left enough space to modify the number of turns of the secondary windings, for example by increasing it by a certain number such as increasing it by 1, 2, 3, 4 or 5 turns from the value currently used in transformer assemblies having an operational frequency of ≈45 kHz, being this for example around around 107.

Reducing the gap in the transformer increases the magnetic flux in the core. Decreasing the frequency increases the magnetic flux, leading to an increase of the losses in the core. On the other hand decreasing the frequency reduces the number of changes in direction of the flux. This, on the contrary, reduces the losses. In this way, the gap was modified, such as reduced by 0.25, 0.5 0.75, 1, 1.1, 1.2 mm from the value currently used in transformer assemblies having an operational frequency of 45 kHz, being this for example around 2.1-2.2 mm.

Thus in some embodiments, the invention relates to a transformer assembly comprising a ferrite shell type core surrounding a primary winding and a secondary winding, wherein the primary windings has a number of turns lower than 14 and the secondary winding has a number of turns higher then 107 and the ferrite shell type core has an airgap smaller than 2 mm.

By decreasing the gap and increasing the number of turns on the secondary winding and decreasing the number of turns on the primary winding the operational frequency was decreased from ≈45 kHz to ≈30 kHz.

This modification may slightly increase the operational temperature. However, the increase of the operational temperature can be reduced by improved cooling solutions.

The first, second, third and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The ozone generator, the method of operating the ozone generator and the transformer assembly according to the invention will now be described in more details with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
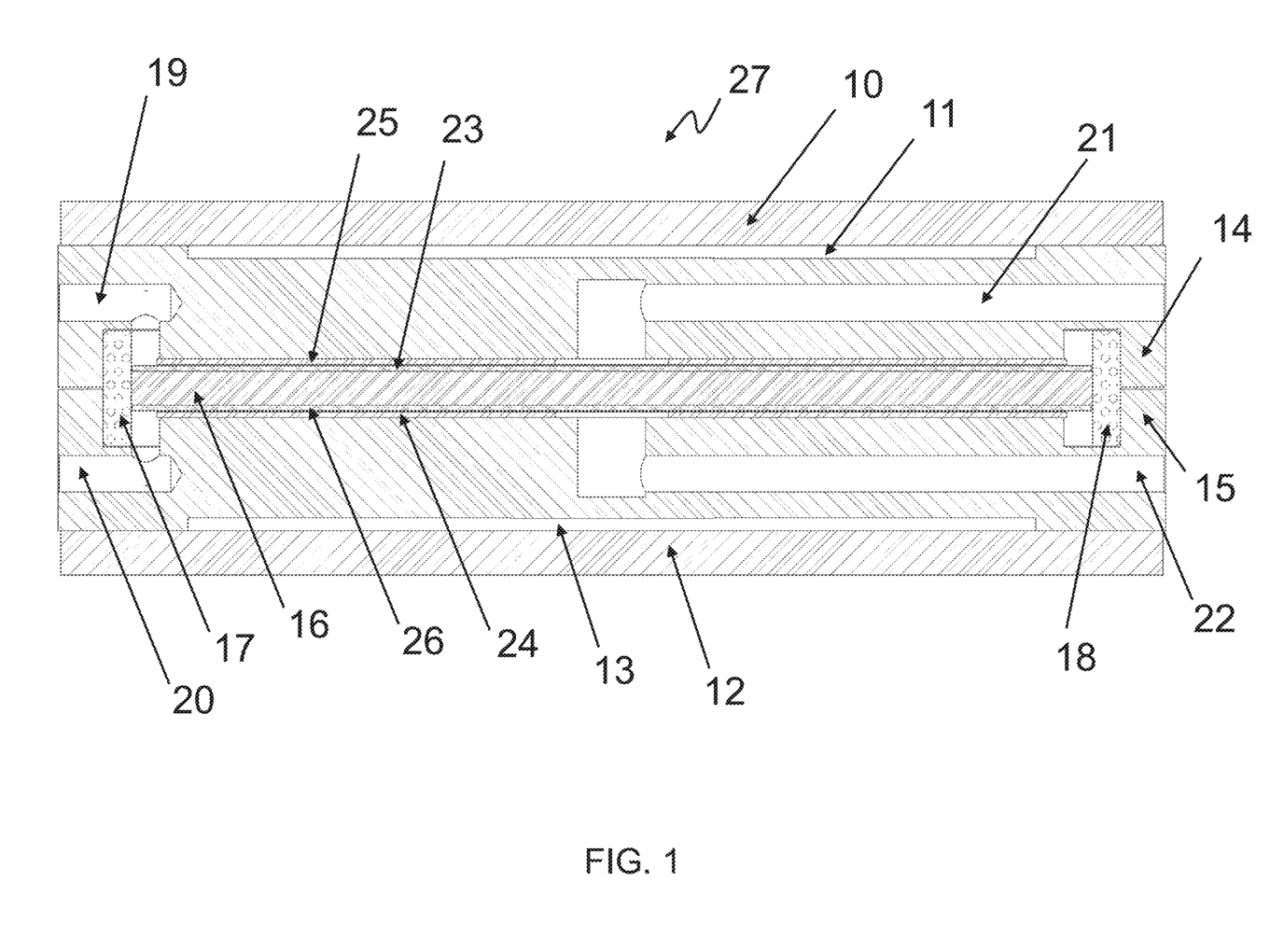
FIG. 1 shows a cross section of an ozone generator unit according to some embodiments of the invention.

FIG. 1 shows an ozone generator unit 27 comprising a first PTFE sheet 23 and second PTFE sheet 24 surrounding a high voltage electrode 16.

The first and a second reaction chamber, in which ozone is generated, are delimited by the first PTFE sheet 23 and second PTFE sheet 24 on one side and the internal surface of the housing or earth electrodes 14 and 15, respectively. Oxygen gas enters the ozone generator unit 27 via inlets 19 and 20, is exposed to corona discharge in first and second reaction chambers leading to the formation of ozone gas that is released through ozone outlets 21 and 22, respectively.

The housing or earth electrodes 14 and 15 are cooled through water cooling flowing in the water cooling chambers 11 and 13. The water cooling chambers 11 and 13 are defined by recesses on the external surface of the earth electrodes 14 and 15 covered by covers 10 and 12.

Stainless steel nets or sheet 25 and 26 are located between the internal surface of the earth electrodes 14 and 15 and the first PTFE sheet 23 and second PTFE sheet 24. Stainless steel nets or sheet 25 and 26 are corona-effect promoting structures promoting discharge between the electrodes.

Support PTFE rings 17 and 18 are arrange between earth electrodes 14 and 15.

Support PTFE rings may have the function of spacers, ensuring the formation of reaction chambers between the earth electrodes and the high voltage electrode.

Figure 2:
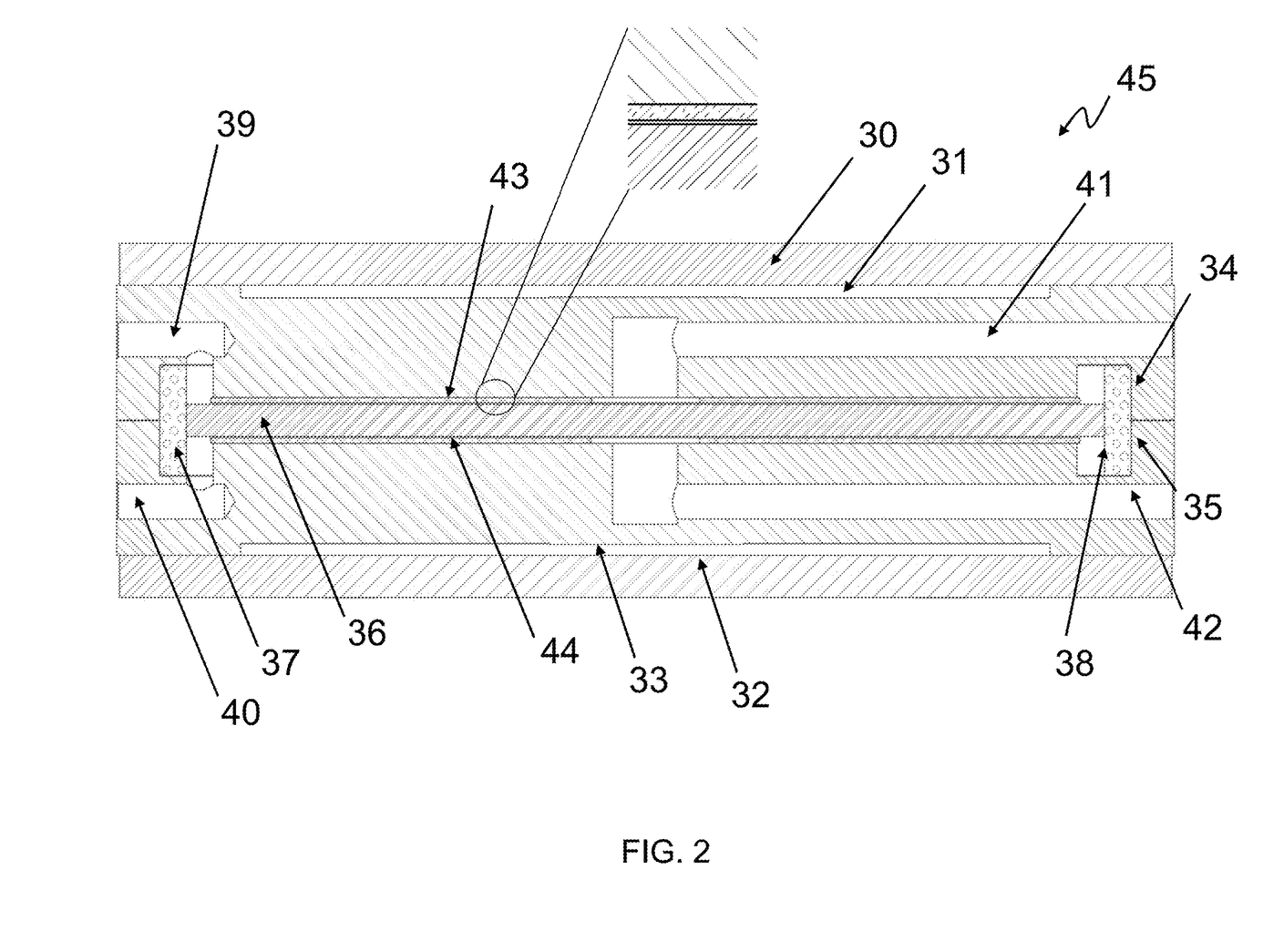
FIG. 2 shows a cross section of an ozone generator unit according to some other embodiments of the invention.

FIG. 2 shows an ozone generator unit 45 comprising a first PTFE sheet 43 and second PTFE sheet 44 surrounding a high voltage electrode 36.

The first and a second reaction chamber, in which ozone is generated, are delimited by the first PTFE sheet 43 and second PTFE sheet 44 on one side and the internal surface of the housing or earth electrodes 34 and 35, respectively.

Oxygen gas enters the ozone generator unit 45 via inlets 39 and 40, is exposed to corona discharge in first and second reaction chambers leading to the formation of ozone gas that is released through ozone outlets 41 and 42, respectively. The housing or earth electrodes 34 and 35 are cooled through water cooling flowing in the water cooling chambers 31 and 33. The water cooling chambers 31 and 33 are defined by recesses on the external surface of the earth electrodes 34 and 35 covered by covers 30 and 32.

Support PTFE rings 37 and 38 are arrange between earth electrodes 34 and 35.

The ozone generator unit 45 has the first and second PTFE sheet 43 and 44 in contact with an internal surface of the first and second reaction chamber, i.e. with the internal surface of the earth electrodes 34 and 35.

This configuration allows for an improved and efficient cooling of the PTFE sheets as being in contact with the internal surface of the earth electrodes that is externally water cooled.

Figure 3:
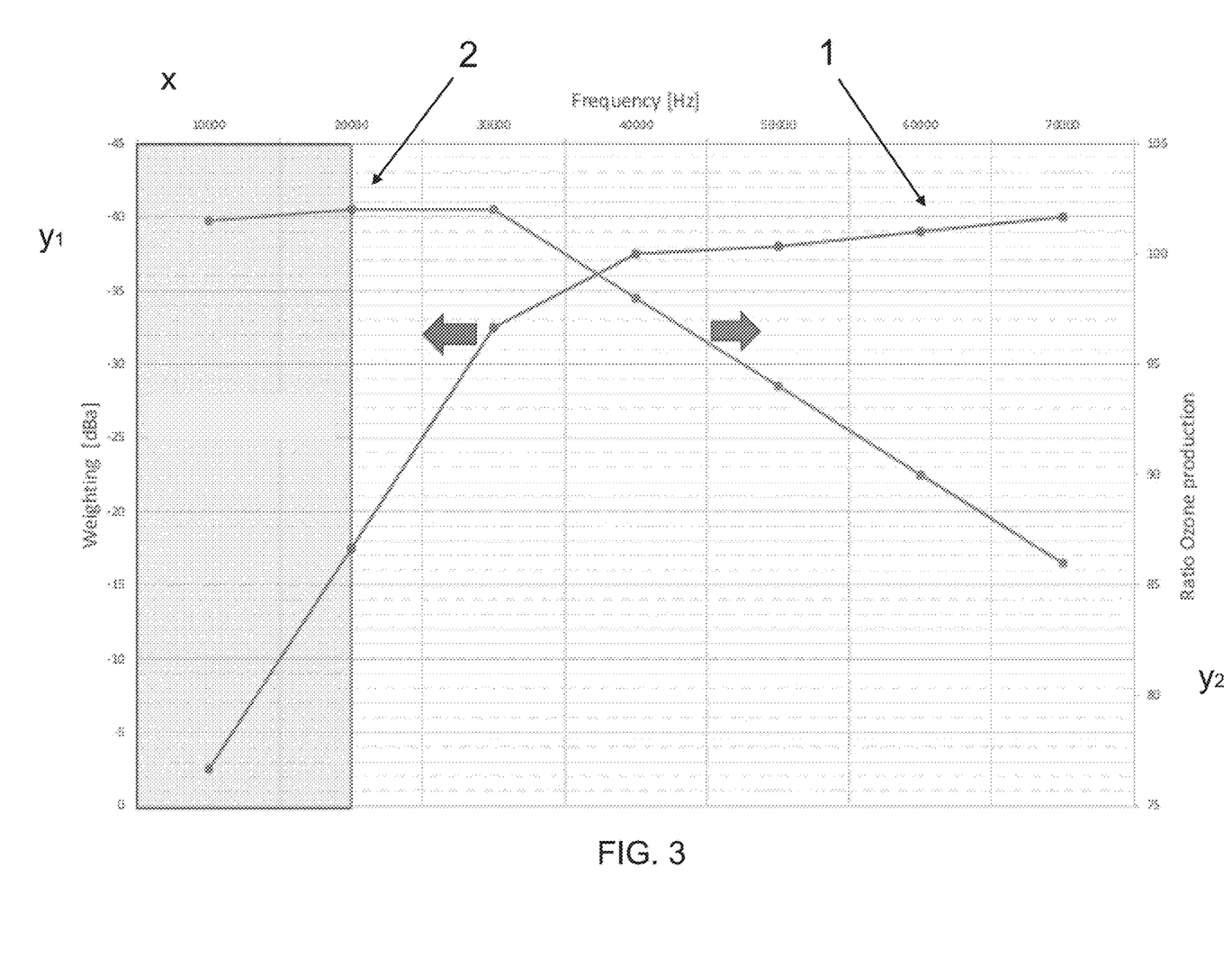
FIG. 3 shows a graph of operational frequency versus weighting audible noise and the ratio between the set value and the actual value of ozone production.

FIG. 3 shows a graph of operational frequency versus weighting audible noise and a ratio between an actual value and a set value of production of ozone production.

The X axis represents the operational frequency, in Hz, of an ozone generator according to the first aspect of the invention.

The $Y_1$ axis is a weighting value of the reduction of audible noise in dBa.

The line 1 represents a collection of data of ozone generators operated at different frequency versus noise reduction.

It can be noticed that the increase of frequency between 10 kHz and 30 kHz produces a substantial reduction of noise, i.e. up to −32.5 dBa. A further increase to 40 kHz provides a further reduction up to −37.5 Dba. An additional increase in operational frequency does not substantially reduce the noise audible by humans, which is produced by the ozone generator.

The $Y_2$ axis is the ratio between an actual value of ozone production and a set value of ozone production $O_{av}/O_{sv}$ at a 200 gr $O_3/Nm^3$ ozone concentration, at 2 bars, 100% capacity of ozone release.

The value 100 on the axis $Y_2$ represents the condition when the set value corresponds to the actual value, thus for a set value of 200 gr $O_3/Nm^3$, the actual value of ozone released is 200 gr $O_3/Nm^3$. Values lower than 100 correspond to conditions in which the set value is higher than the actual ozone release, i.e. less ozone is released compared to the set value.

Values higher than 100 correspond to conditions in which the set value is lower than the actual ozone release, i.e. more ozone is released compared to the set value.

Line 2 shows the correspondence between the set values and actual values depending on the operational frequency.

It can be noticed that the higher the operational frequency, the worse the correspondence between the set value and the actual value of ozone released.

Indeed at high frequency, e.g. at 60 kHz, the correspondent value of 90 means that for a set value of 200 gr $O_3/Nm^3$ only 180 gr $O_3/Nm^3$ are released.

Reducing the operational frequency improves the correspondence between the set value and actual value of ozone released.

For example, for an operational frequency of 30 kHz, the correspondent value of 102 means that for a set value of 200 gr $O_3/Nm^3$, 204 gr $O_3/Nm^3$ are released.

Within the acceptable limits of deviation between set and actual value, i.e. 100+/−2, the operational frequency between 30 and 40 kHz was surprisingly found as the frequency providing the lowest audible noise, i.e. the highest reduction in dBa, i.e. between −32.5 Dba and −37.5 Dba.

The inventors thus configured the ozone generator so as to be operated with a frequency between 30 and 40 kHz.

Figure 4:
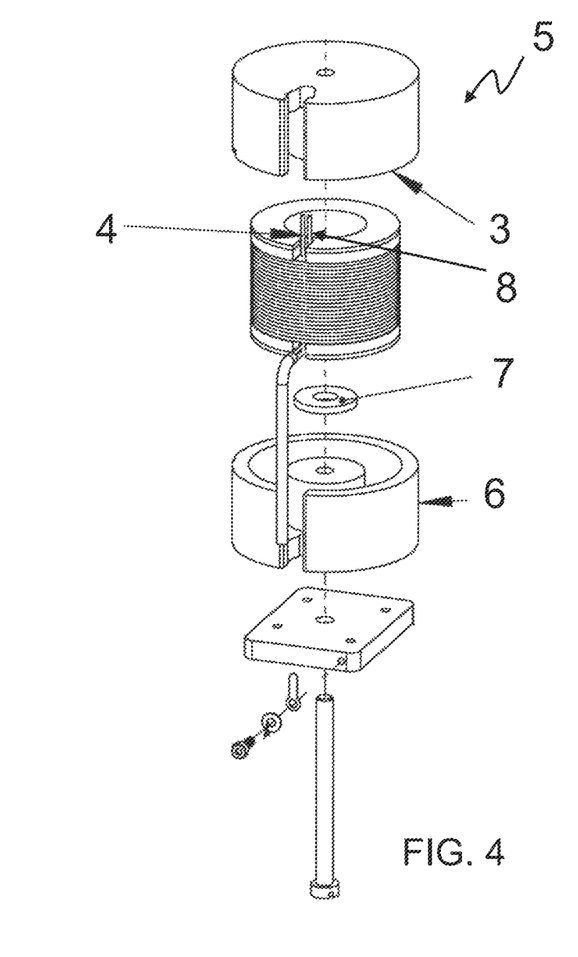
FIG. 4 is an exploded view of the transformer assembly according to some embodiments of the invention.

In FIG. 4, the transformer assembly 5 according to some embodiments of the invention comprises a ferrite core having two parts 3 and 6 separated by a gap pad 7 and a primary and secondary windings 4 and 8.

Figure 5:
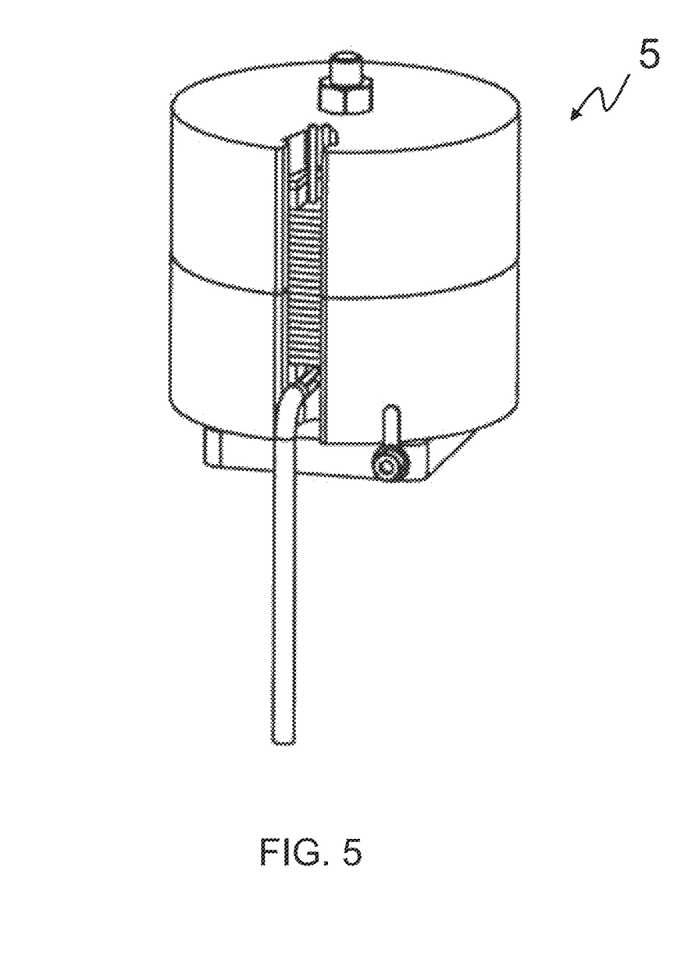
FIG. 5 is a perspective view of the transformer assembly according to some embodiments of the invention.

FIG. 5 is a perspective view of the transformer assembly 5 showed in an exploded view in FIG. 4.

Figure 6:
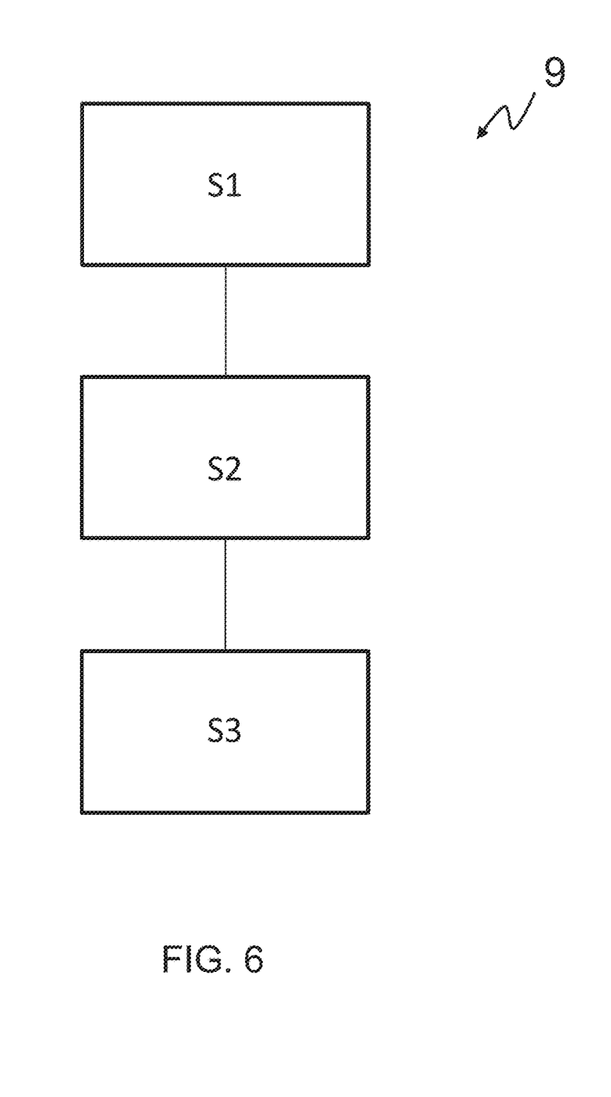
FIG. 6 is a flow-chart of a method of operating an ozone generator according to some embodiments of the invention.

FIG. 6 is a flow-chart of a method of operating an ozone generator 9, the ozone generator apparatus according to the first aspect of the invention the method comprising operating the ozone generator apparatus at a frequency between 25-40 KHz, such as between 30 and 40 kHz.

The operating of the ozone generator comprises:
S1, supplying a flow of fluid containing oxygen gas to the ozone generator;
S2, controlling the flow of fluid containing oxygen gas;
S3, controlling a power supplied from a power supply apparatus to the ozone generator at a frequency between 25-40 kHz, such as between 30 and 40 kHz.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An ozone generator apparatus comprising:
an ozone generator unit comprising:
a high voltage electrode unit;
a first dielectric element and a second dielectric element;
a first earth electrode and a second earth electrode;
wherein said high voltage electrode unit is located between said first dielectric element and said second dielectric element; and
wherein said generator unit is configured to be operated at an operational frequency range between 30 and 40 kHz; and
an AC power supply, being a transformer assembly, configured to provide between 50 and 800 Watts at a frequency between 30 and 40 kHz to the ozone generator unit.

2. The ozone generator apparatus according to claim 1, wherein said first dielectric element and said second dielectric element are located at a distance from said high voltage electrode unit within a range between 0.01 and 0.1 millimeters.

3. The ozone generator apparatus according to claim 1, wherein said first dielectric element and said second dielectric element are spaced apart from said high voltage electrode unit by one or more spacer elements.

4. The ozone generator apparatus according to claim 1, wherein said first dielectric element and said second dielectric element are arranged on both sides of said high voltage electrode.

5. The ozone generator apparatus according to claim 1, wherein said first earth electrode and said second earth electrode delimit a first reaction chamber and a second reaction chamber with said first dielectric element and said second dielectric element.

6. The ozone generator apparatus according to claim 1, wherein said high voltage electrode is a metallic coating on said first dielectric element and said second dielectric element.

7. The ozone generator apparatus according to claim 1, wherein said high voltage electrode is a metal foil or a metal sheet.

8. The ozone generator apparatus according to claim 1, wherein said first reaction chamber and said second reaction chamber comprise each at least an inlet configured to supply oxygen or an oxygen containing gas and at least an outlet for releasing ozone.

9. The ozone generator apparatus according to claim 1, wherein an external surface of said first reaction chamber and said second reaction chamber comprises a cooling element.

10. The ozone generator apparatus according to claim 1, wherein said first dielectric element and said second dielectric element are in contact with an internal surface of said first reaction chamber and said second reaction chamber.

11. The ozone generator apparatus according to claim 1, wherein said transformer assembly is a high power transformer.

12. The ozone generator apparatus according to claim 1, wherein said transformer assembly is a power transformer comprising a ferrite shell type core surrounding a primary winding and a secondary winding, wherein said primary windings has a number of turns lower than 14 and said secondary winding has a number of turns higher than 107 and said ferrite shell type core has an airgap smaller than 2 mm.

13. A method of operating the ozone generator apparatus according to claim 1, said method comprising:
   operating the ozone generator apparatus of claim 1 at the frequency between 30 and 40 KHz.

14. A method of operating the ozone generator apparatus according to claim 13,
   wherein said operating comprises:
      supplying a flow of fluid containing oxygen to said ozone generator apparatus;
      controlling said flow of fluid containing oxygen; and
      controlling power supplied from the power supply to said ozone generator at the frequency between 30 and 40 KHz.

15. A method of operating the ozone generator apparatus according to claim 13, wherein said frequency is a frequency between 31 and 40 kHz.

\* \* \* \* \*